US012785108B2

(12) United States Patent
Tang et al.

(10) Patent No.: US 12,785,108 B2
(45) Date of Patent: Nov. 3, 2026

(54) NEGATIVE ELECTRODE CURRENT COLLECTOR, SECONDARY BATTERY, AND ELECTRICAL DEVICE

(71) Applicant: CONTEMPORARY AMPEREX TECHNOLOGY (HONG KONG) LIMITED, Hong Kong (CN)

(72) Inventors: Zheng Tang, Ningde (CN); Yonghuang Ye, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 32 days.

(21) Appl. No.: 19/211,326

(22) Filed: May 19, 2025

(65) Prior Publication Data

US 2025/0279437 A1 Sep. 4, 2025

Related U.S. Application Data

(63) Continuation of application No. PCT/CN2023/090574, filed on Apr. 25, 2023.

(51) Int. Cl.

| | |
|---|---|
| ***H01M 4/1395*** | (2010.01) |
| ***H01M 4/134*** | (2010.01) |
| ***H01M 4/66*** | (2006.01) |
| ***H01M 10/054*** | (2010.01) |
| *H01M 4/02* | (2006.01) |

(52) U.S. Cl.

CPC ........... *H01M 4/667* (2013.01); *H01M 4/134* (2013.01); *H01M 4/1395* (2013.01); *H01M 4/661* (2013.01); *H01M 4/663* (2013.01); *H01M 4/666* (2013.01); *H01M 10/054* (2013.01); *H01M 2004/027* (2013.01); *H01M 2220/20* (2013.01)

(58) Field of Classification Search

None

See application file for complete search history.

(56) References Cited

U.S. PATENT DOCUMENTS

| | | | | |
|---|---|---|---|---|
| 2012/0082892 A1* | 4/2012 | Kobayashi | H01M 4/661 | 429/211 |
| 2012/0171574 A1* | 7/2012 | Zhamu | H01G 11/30 | 977/734 |
| 2012/0321913 A1* | 12/2012 | Hua | H01G 11/06 | 156/154 |
| 2019/0173092 A1* | 6/2019 | Liang | H01M 4/662 | |

(Continued)

FOREIGN PATENT DOCUMENTS

| | | |
|---|---|---|
| CN | 101847513 A | 9/2010 |
| CN | 102447131 A | 5/2012 |

(Continued)

OTHER PUBLICATIONS

English translation of CN 113437254 (Year: 2021).*

(Continued)

*Primary Examiner* — Yoshitoshi Takeuchi
(74) *Attorney, Agent, or Firm* — XSENSUS LLP

(57) ABSTRACT

A negative electrode current collector may comprise a metal substrate and a conductive layer provided on at least one surface of the metal substrate, the negative electrode current collector may have a Vickers hardness of 400 MPa-900 MPa, and the conductive layer may have a thickness of 0.5 μm-6 μm.

12 Claims, 2 Drawing Sheets

(56) References Cited

U.S. PATENT DOCUMENTS

| | | | | |
|---|---|---|---|---|
| 2019/0173093 | A1* | 6/2019 | Liang | H01M 4/0404 |
| 2021/0119219 | A1* | 4/2021 | Liu | H01M 4/667 |
| 2021/0313574 | A1* | 10/2021 | Tanaami | H01M 4/587 |
| 2022/0085380 | A1* | 3/2022 | Liu | H01M 4/663 |
| 2022/0085384 | A1* | 3/2022 | Liu | H01M 4/667 |
| 2022/0093932 | A1* | 3/2022 | Li | H01M 4/661 |
| 2022/0102732 | A1* | 3/2022 | Li | H01M 4/0404 |
| 2022/0209226 | A1* | 6/2022 | Li | H01M 4/667 |
| 2023/0253567 | A1* | 8/2023 | Wable | H01M 10/052 |
| 2023/0327114 | A1* | 10/2023 | Zeng | H01M 4/661<br>429/217 |

FOREIGN PATENT DOCUMENTS

| | | | | |
|---|---|---|---|---|
| CN | 112055902 | A | 12/2020 | |
| CN | 113437254 | * | 9/2021 | H01M 10/054 |
| EP | 4220755 | A1 | 8/2023 | |
| JP | 2020-113415 | A | 7/2020 | |
| WO | 2022/267538 | A1 | 12/2022 | |

OTHER PUBLICATIONS

International Search Report and Written Opinion mailed on Dec. 5, 2023, received for PCT Application PCT/CN2023/090574, filed on Apr. 25, 2023, 16 pages including English Translation.

Extended European Search Report issued Feb. 5, 2026 in European Patent Application No. 23934422.9.

Chenna Krishna S et al: "On the Prediction of Strength from Hardness for Copper Alloys", Journal of Materials, Hindawi Publishing Corporation, US, vol. 2013, Apr. 8, 2013, pp. 1-6.

Kumar A Madhan et al: "Promising Hard Carbon Coatings on Cu Substrates: Corrosion and Tribological Performance with Theoretical Aspect", Materials Performance and Characterization, Springer US, New York, vol. 27, No. 5, Jan. 19, 2018, pp. 2306-2316.

Ni Qiao et al: "Anode-Free Rechargeable Sodium-Metal Batteries", Batteries, vol. 8, No. 12, Dec. 5, 2022, p. 272.

* cited by examiner

NEGATIVE ELECTRODE CURRENT COLLECTOR, SECONDARY BATTERY, AND ELECTRICAL DEVICE

CROSS-REFERENCE TO RELATED APPLICATION

This application is a bypass continuation of International Application No. PCT/CN2023/090574, filed on Apr. 25, 2023, which is hereby incorporated by reference in its entirety.

TECHNICAL FIELD

The present application relates to the technical field of batteries, and in particular, to a negative electrode current collector, a secondary battery, and an electrical device.

BACKGROUND

Sodium-ion batteries operate on a similar principle to that of lithium-ion batteries. As sodium is more abundant on Earth, sodium-ion batteries are expected to replace lithium-ion batteries as the next-generation commercial energy storage device. Due to the higher reduction potential and greater relative molecular mass of metal sodium than those of metal lithium, the energy density of sodium-ion batteries, despite the similar operating principle, is significantly lower than that of lithium-ion batteries. Additionally, the greater ionic radius of sodium ion leads to greater volume expansion during the intercalation and deintercalation in both the positive and negative electrode materials, such that the cycle reversibility of the battery is reduced. These factors significantly hinder the promotion and application of sodium-ion batteries.

With the advancements in electrolyte and additive technology and surface modification technology, the dendritic growth of sodium caused by uneven deposition on the surface of the metal, as a long-standing issue in the scientific community, is remarkably improved. As a result, the safety performance of the product is expected to be greatly enhanced, bringing the sodium metal negative electrode with high energy density back into focus. To further achieve higher battery cell energy density, "negative electrode-free" sodium metal battery is developed, in which sodium is extracted from the positive electrode material and deposited in situ on the negative electrode current collector.

In order to pursue higher energy density of the battery, the negative electrode current collector and the conductive layer of the negative electrode plate are made thinner. However, the thinned negative electrode current collector becomes more flexible, which complicates the battery processing and results in a reduced yield.

SUMMARY

The present application provides a negative electrode current collector, a secondary battery, and an electrical device to improve the processability of the battery and ensure the high-capacity characteristics of the battery.

A first aspect of the present application provides a negative electrode current collector. The negative electrode current collector includes a metal substrate and a conductive layer provided on at least one surface of the metal substrate, where the negative electrode current collector has a Vickers hardness of 400 Mpa-850 Mpa, and the conductive layer has a thickness of 0.5 μm-6 μm, optionally 0.5 μm-5 μm.

In the above embodiment, on the basis of minimized increases in thickness of the conductive layer, the overall hardness of the negative electrode current collector is improved, thereby improving the processability of the negative electrode plate while ensuring the high-capacity characteristics of the battery. Moreover, the control on the hardness of the negative electrode current collector avoids the occurrence of a brittle failure during processing caused by excessive hardness of the negative electrode current collector. If the thickness of the conductive layer exceeds 6 μm, the negative electrode current collector is susceptible to breakage, and the negative electrode plate is prone to edge collapse, leading to severe separation between powder materials and the current collector and difficulties in cutting and subsequent processing.

In any embodiment according to the first aspect, the conductive layer includes a conductive particle and a binder, the conductive particle includes a first conductive material and a second conductive material, the first conductive material includes any one or more selected from the group consisting of a hard carbon and a soft carbon, and the second conductive material includes any one or more selected from the group consisting of a conductive carbon black, a carbon dot, a graphene, a carbon nanotube, a carbon fiber, and a metal micro-nano particle; optionally, the conductive carbon black includes Ketjen black, acetylene black, and Super P carbon black. The first conductive material has a greater hardness, which increases the hardness of the conductive layer; the second conductive material, with better conductivity and a greater specific surface area, facilitates the material deposition and improves the cycle reversibility of metal sodium or metal lithium.

In any embodiment according to the first aspect, the conductive particle includes the hard carbon and the conductive carbon black, and optionally, the hard carbon is present in the conductive particle at a mass content of 50%-90%, and the conductive carbon black is present in the conductive particle at a mass content of 10%-50%; or the conductive particle includes the hard carbon, the conductive carbon black, and the carbon nanotube, and optionally, the hard carbon is present in the conductive particle at a mass content of 50%-90%, the conductive carbon black is present in the conductive particle at a mass content of 10%-50%, and the carbon nanotube is present in the conductive particle at a mass content of 0.001%-1%. The conductive carbon black features good conductivity and cost-efficiency, and the addition of the carbon nanotube can improve the conductivity and the deposition effect of sodium on the negative electrode current collector.

In any embodiment according to the first aspect, the hard carbon has a Vickers hardness of 450 Mpa-800 Mpa. In any embodiment according to the first aspect, the first conductive material has a $D_v50$ particle size of 0.5 μm-6 μm.

In any embodiment according to the first aspect, the second conductive material has a BET specific surface area of 5 $m^2/g$-3000 $m^2/g$, optionally 5 $m^2/g$-400 $m^2/g$. A second conductive material with a greater BET specific surface area has a greater deposition area, which significantly reduces the contact resistance and thus facilitates the deposition of metal sodium or metal lithium on the negative electrode current collector. However, an excessive BET specific surface area and a correspondingly insufficient particle size of the second conductive material may lead to agglomeration, resulting in uneven stress on the electrode plate and ease to crack.

In any embodiment according to the first aspect, the carbon nanotube satisfies any one or more of the following conditions:

(1) the carbon nanotube has an average length of 0.5 μm-30 μm, optionally 2 μm-20 μm;

(2) the carbon nanotube has an average diameter of 1 nm-100 nm, optionally 5 nm-10 nm;

(3) the carbon nanotube has a BET specific surface area of 200 $m^2$/g-3000 $m^2$/g, optionally 250 $m^2$/g-2000 $m^2$/g.

In any embodiment according to the first aspect, the conductive particle is present in the conductive layer at a mass content of 75%-98%, and the binder is present in the conductive layer at a mass content of 2%-25%.

In any embodiment according to the first aspect, the binder includes one or more selected from the group consisting of polyvinylidene fluoride, polytetrafluoroethylene, sodium carboxymethylcellulose, methyl acrylate, ethyl acrylate, and a methyl methacrylate-acrylonitrile copolymer.

In any embodiment according to the first aspect, the metal substrate includes any one of a copper foil, a porous copper, a copper nanowire, an aluminum foil, and an aluminum alloy foil; optionally, the copper foil includes a double-sided rough copper foil, a double-sided smooth copper foil, and a carbon-coated copper foil; optionally, the porous copper includes a porous copper foam and a copper mesh.

In any embodiment according to the first aspect, the metal substrate has a thickness of 5 μm-60 μm, optionally 5 μm-10 μm.

A second aspect of the present application provides a secondary battery. The secondary battery includes a positive electrode plate and a negative electrode plate, where the negative electrode plate includes a negative electrode current collector, and the negative electrode current collector includes any one of the negative electrode current collectors according to the first aspects. The increased hardness of the negative electrode current collector provided by the present application improves the processing performance of the negative electrode current collector; due to the control of the thickness of the conductive layer, the capacity of the battery is enhanced. Therefore, the secondary battery of the present application features high processability and high-capacity characteristics.

In any embodiment according to the second aspect, the negative electrode plate is formed by in-situ deposition of a sodium layer on the negative electrode current collector after the secondary battery has been subjected to the first charge and discharge cycle. The sodium dendrite of the negative electrode plate provided by the present application is effectively controlled.

In any embodiment according to the second aspect, a positive electrode active substance of the positive electrode plate includes any one or more oxides having the chemical formula of $Na_xM_yP_mO_n$, where M denotes a transition metal element including any one or more selected from the group consisting of Mn, Fe, Co, Cu, Al, Ti, and V, $1 \le x \le 2$, $0 \le y \le 1$, $1 \le m \le 2$, $4 \le n \le 8$, and $0 \le x/m \le 1$.

In any embodiment according to the second aspect, the secondary battery further includes an electrolyte, the electrolyte includes a solvent and an electrolyte salt, the solvent includes one or more selected from the group consisting of dimethyl sulfide, dimethoxyethane (DME), dioxolane (DOL), acetonitrile (AN), diethylene glycol dimethyl ether (DIGLYME), methyl trifluoroethyl carbonate (FEMC), fluorobenzene, tetraethylene glycol dimethyl ether (TETRAGLYME), triethyl phosphate, sulfolane, 2-methyl tetrahydrofuran, tetrahydrofuran, 2,2,2,2-trifluoroethyl ether, ethylene glycol diethyl ether, dimethyl sulfoxide, N,N-dimethylacetamide, and triethylene glycol dimethyl ether; optionally, the solvent includes tetrahydrofuran and/or dimethoxyethane.

In any embodiment according to the second aspect, the electrolyte salt includes at least two selected from the group consisting of sodium hexafluorophosphate ($NaPF_6$), sodium perchlorate ($NaClO_4$), sodium bis(fluorosulfonyl)imide (NaFSI), sodium trifluoromethanesulfonate, sodium sulfide, and sodium nitrate; optionally, the electrolyte salt includes a double salt of $NaPF_6$ and $NaNO_3$.

A third aspect of the present application provides an electrical device. The electrical device includes a secondary battery, where the secondary battery is selected from any one of the secondary batteries according to the second aspect. The electrical device has high-capacity characteristics.

BRIEF DESCRIPTION OF THE DRAWINGS

To more clearly illustrate the technical solutions in the embodiments of the present application, the drawings required for illustrating the embodiments of the present application are briefly described below. Apparently, the drawings in the following description illustrate merely some embodiments of the present application, and those of ordinary skill in the art may still derive other drawings from these drawings without creative efforts.

Figure 1:
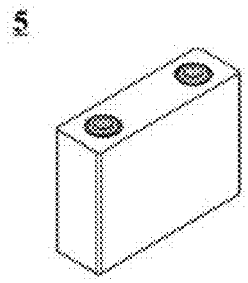
FIG. 1 is a schematic view of a secondary battery according to one embodiment of the present application.

The drawings are not necessarily drawn to scale.

DESCRIPTION OF REFERENCE NUMERALS

1: battery pack; 2: upper case body; 3: lower case body; 4: battery module; 5: secondary battery; 51: housing; 52: electrode assembly; 53: top cover assembly.

DETAILED DESCRIPTION

The embodiments of the present application will be described in further detail with reference to the drawings and examples. The following detailed description of the examples and the drawings are used for the exemplary illustration of the principles of the present application, but are not intended to limit the scope of the present application. That is, the present application is not limited to the described examples.

Hereinafter, the embodiments of the negative electrode plate, the secondary battery, and the electrical device of the present application are specifically disclosed in detail with appropriate reference to the drawings. However, unnecessarily detailed descriptions may be omitted. For example, detailed descriptions of well-known matters and repetitive descriptions of substantially identical structures may be omitted. This is to avoid unnecessary lengthiness of the following descriptions and to facilitate understanding by those skilled in the art. Additionally, the drawings and the following descriptions are provided to enable those skilled in the art to fully understand the present application and are not intended to limit the subject matter recited in the claims.

The "ranges" disclosed in the present application are defined with lower and upper limits. A given range is defined by selecting a lower limit and an upper limit that delineate the boundaries of a particular range. Ranges defined in this manner may include or exclude the end values and can be combined arbitrarily, which means that any lower limit may be combined with any upper limit to form a range. For example, if ranges of 60-120 and 80-110 are listed for a particular parameter, it will be appreciated that ranges of 60-110 and 80-120 are also anticipated. Additionally, if the minimum range values listed are 1 and 2, and the maximum range values listed are 3, 4, and 5, then the following ranges can all be anticipated: 1-3, 1-4, 1-5, 2-3, 2-4, and 2-5. In the present application, unless otherwise specified, the numerical range "a-b" represents an abbreviated representation of any combination of real numbers between a and b, where both a and b are real numbers. For example, the numerical range "0-5" indicates that all real numbers between "0-5" are listed herein, and "0-5" is merely an abbreviated representation of a combination of these numerical values. Additionally, when stating that a parameter is an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application can be combined with one another to form new technical solutions.

Unless otherwise specified, all technical features and optional technical features of the present application can be combined with one another to form new technical solutions.

Unless otherwise specified, all steps of the present application can be performed sequentially or randomly, preferably sequentially. For example, if the method includes steps (a) and (b), it indicates that the method may include steps (a) and (b) performed sequentially or steps (b) and (a) performed sequentially. For example, if the mentioned method may further include step (c), it indicates that step (c) may be added to the method in any order; for example, the method may include steps (a), (b), and (c), or steps (a), (c), and (b), or steps (c), (a), and (b), or the like.

Unless otherwise specified, the "include" and "comprise" mentioned in the present application are open-ended or closed-ended. For example, the "include" and "comprise" may mean that other unlisted components may also be included or comprised or that only the listed components are included or comprised.

Unless otherwise specified, the term "or" in the present application is inclusive. For example, the phrase "A or B" means "A, B, or both A and B". More specifically, any one of the following conditions satisfies the condition "A or B": A is true (or present) and B is false (or absent); A is false (or absent) and B is true (or present); or both A and B are true (or present).

[Negative Electrode Current Collector]

In order to increase the hardness of the negative electrode plate and improve its processability, the thickness of the conductive layer in the negative electrode current collector is generally increased. That is, the ratio of the conductive layer to the current collector is increased, which may result in a greater hardness of the electrode plate and easier processing. However, in the experiment of increasing the thickness of the conductive layer, it has been found that the capacity performance of the negative electrode battery is deteriorated by simply increasing the thickness. The reasons for this may be that when the thickness of the conductive layer is increased, the conductive layer consumes some lithium ions or sodium ions, resulting in an insufficient amount of lithium metal or sodium metal deposited on the conductive layer. Moreover, such a chemical reaction may be repeated during the charging and discharging process of the battery, ultimately leading to a decrease in the capacity of the battery and an imbalance between the battery performance and the processing performance.

One embodiment of the present application provides a negative electrode current collector. The negative electrode current collector includes a metal substrate and a conductive layer provided on at least one surface of the metal substrate, where the conductive layer includes a conductive particle and a binder, the negative electrode current collector has a Vickers hardness of 400 Mpa-850 Mpa, and the conductive layer has a thickness of 0.5 μm-6 μm.

In the above embodiment, on the basis of minimized increases in thickness of the conductive layer, the overall hardness of the negative electrode current collector is improved, thereby improving the processability of the negative electrode plate while ensuring the high-capacity characteristics of the battery. Moreover, the control on the hardness of the negative electrode current collector avoids the occurrence of a brittle failure during processing caused by excessive hardness of the negative electrode current collector. If the thickness of the conductive layer exceeds the range described above, the negative electrode current collector is susceptible to breakage, and the negative electrode plate is prone to edge collapse, leading to severe separation between powder materials and the current collector and difficulties in cutting and subsequent processing.

Optionally, the negative electrode current collector has a Vickers hardness of 400 Mpa-850 Mpa, including but not limited to, 400 Mpa, 450 Mpa, 460 Mpa, 480 Mpa, 500 Mpa, 550 Mpa, 600 Mpa, 650 Mpa, 700 Mpa, 750 Mpa, 800 Mpa, 810 Mpa, or 850 Mpa; optionally, the negative electrode current collector has a Vickers hardness of 460 Mpa-800 Mpa, 550 Mpa-800 Mpa, or 600 Mpa-760 Mpa.

Generally, a smaller thickness of the conductive layer may lead to a greater capacity density of the battery. However, an insufficient thickness of the conductive layer may lead to ineffective sodium deposition and problems in sodium intercalation and affect the battery capacity and cycle performance. Optionally, the conductive layer may also have a thickness of 0.5 μm-5 μm, 1 μm-6 μm, 1 μm-5 μm, or 1 μm-4 μm; in some embodiments, the thickness of the conductive layer includes, but is not limited to, 0.5 μm, 1 μm, 1.2 μm, 1.5 μm, 2 μm, 2.5 μm, 3 μm, 3.5 μm, 4 μm, 4.5 μm, 5 μm, 5.5 μm, or 6 μm.

The Vickers hardness of the negative electrode current collector may be tested in accordance with GBT_7997-2014 Hardmetals—Vickers Hardness Test.

In order to maximize the Vickers hardness of the conductive particle while improving the conductivity thereof, the conductive layer includes a conductive particle and a binder in some embodiments. The overall hardness of the negative electrode current collector may be improved by using a conductive particle with a greater hardness or a binder with a greater hardness or a metal substrate with a greater hardness in the art.

In some embodiments, the conductive particle includes a first conductive material and a second conductive material, the first conductive material includes any one or more selected from the group consisting of a hard carbon and a soft carbon, and the second conductive material includes any one or more selected from the group consisting of a conductive carbon black, a carbon dot, a graphene, a carbon nanotube, a carbon fiber, and a metal micro-nano particle; optionally, the conductive carbon black includes Ketjen black, acetylene black, and Super P carbon black.

The first conductive material has a greater hardness, which increases the hardness of the conductive layer; the second conductive material, with better conductivity and a greater specific surface area, facilitates the material deposition and improves the cycle reversibility of metal sodium or metal lithium.

The graphene, carbon nanotube and carbon fiber may be an unmodified graphene oxide, reduced graphene, single-walled carbon nanotube, multi-walled carbon nanotube, and carbon fiber, and may also be a modified graphene oxide, reduced graphene, single-walled carbon nanotube, multi-walled carbon nanotube, and carbon fiber, where the corresponding modified carbon material has more active sites, which is more beneficial for depositing metal sodium or metal lithium and enhancing the reversibility of metal sodium or metal lithium. The micro-nano metal particles are metal particles or modified metal particles with a particle size in the nano or micron range, where the metal includes, but is not limited to, Zn, Cu, Mg, or Sn.

In some embodiments, the conductive particle includes the hard carbon and the conductive carbon black, and optionally, the hard carbon is present in the conductive particle at a mass content of 50%-90%, and the conductive carbon black is present in the conductive particle at a mass content of 10%-50%; or the conductive particle includes the hard carbon, the conductive carbon black, and the carbon nanotube, and optionally, the hard carbon is present in the conductive particle at a mass content of 50%-90%, the conductive carbon black is present in the conductive particle at a mass content of 10%-50%, and the carbon nanotube is present in the conductive particle at a mass content of 0.001%-1%. The conductive carbon black features good conductivity and cost-efficiency, and the addition of the carbon nanotube can improve the conductivity and the deposition effect of sodium on the negative electrode current collector. However, the cost of the carbon nanotube is significantly greater than the conductive carbon black. Therefore, the content of the carbon nanotube in the conductive particle is controlled at 1% or less, so as to control the cost of the current collector. Certainly, regardless of the cost, the conductive particle may contain a greater amount of the carbon nanotube, such as 2%, 3%, 4%, 5%, and 10%.

In some embodiments, a hard carbon particle with a greater Vickers hardness is selected to increase the hardness of the negative electrode current collector. For example, the hard carbon has a Vickers hardness of 450 Mpa-800 Mpa. By using a hard carbon with a greater Vickers hardness, the hardness of the conductive layer is increased, which increases the overall hardness of the negative electrode current collector is increased. Moreover, the increased hardness of the conductive layer allows an easier control of the conductive layer's thickness in a smaller range less than 6 μm, which is beneficial for improving the capacity performance of the battery.

In some embodiments, the Vickers hardness of the hard carbon is optionally 550 MPa-800 MPa or 600 MPa-790 MPa, and in some embodiments, the Vickers hardness of the hard carbon includes, but is not limited to, 550 MPa, 600 MPa, 630 MPa, 650 MPa, 670 MPa, 700 MPa, 710 MPa, 730 MPa, 740 MPa, 750 MPa, 790 MPa, or 800 MPa.

The Vickers hardness of the hard carbon in the negative electrode current collector can be tested by the following method:

The electrode plate is disassembled, the conductive layer is scrapped off, and then the hard carbon is separated by centrifugation (the conductive layer is scrapped off, dissolved in NMP, and separated by centrifugation, in which the hard carbon is precipitated). The Vickers hardness of the hard carbon is then directly measured in accordance with GBT_7997-2014 Hardmetals—Vickers Hardness Test.

Due to its high hardness, the first conductive material, as a particle, has an increased wetting angle with metal sodium or metal lithium, which affects the deposition of the sodium metal or lithium metal. In order to minimize this effect, in some embodiments, the first conductive material has a $D_V50$ particle size of 0.5 μm-6 μm. The first conductive material has a $D_V50$ particle size controlled at 0.5 μm-6 μm, which ensures a wetting angle between the first conductive material and sodium or lithium of less than 90 degrees. As a result, sodium or lithium deposited on the first conductive material is smoother, thus effectively reducing sodium dendrite and damages to a separation film. Moreover, a smaller $D_V50$ particle size of the first conductive material within the above range may result in a dispersed distribution in the conductive layer that is desirable for improving the Vickers hardness of the negative electrode current collector. In some embodiments, the $D_V50$ particle size of the first conductive material is optionally 1 μm-6 μm, 0.5 μm-5 μm, or 1 μm-2 μm, for example, 0.5 μm, 1 μm, 1.5 μm, 2 μm, 2.5 μm, 3 μm, 3.5 μm, 4 μm, 4.5 μm, 5 μm, 5.5 μm, or 6 μm. The above $D_V50$ is measured using a laser particle size analyzer.

The conductive coating of the negative electrode current collector can reduce the contact resistance between metal sodium and the negative electrode current collector during charging, and increase the acting force between metal sodium or metal lithium and the negative electrode current collector, thereby alleviating the peeling of the metal sodium layer or the metal lithium layer. In order to improve the contact performance between the conductive particle and metal sodium or metal lithium and to fully utilize the function thereof, in some embodiments, the second conductive material has a BET specific surface area of 5 $m^2/g$-3000 $m^2/g$, for example, including but not limited to, 5 $m^2/g$, 10 $m^2/g$, 50 $m^2/g$, 100 $m^2/g$, 150 $m^2/g$, 200 $m^2/g$, 250 $m^2/g$, 300 $m^2/g$, 360 $m^2/g$, 400 $m^2/g$, 500 $m^2/g$, 600 $m^2/g$, 700 $m^2/g$, 900 $m^2/g$, 1200 $m^2/g$, 1600 $m^2/g$, 1800 $m^2/g$, 2000 $m^2/g$, 2500 $m^2/g$, or 3000 $m^2/g$. A second conductive material with a greater BET specific surface area has a greater deposition area, which significantly reduces the contact resistance and thus facilitates the deposition of metal sodium or metal lithium on the negative electrode current collector. However, an excessive BET specific surface area may lead to agglomeration, resulting in uneven stress on the electrode plate and ease to crack.

In some embodiments, the BET specific surface area of the second conductive material is optionally 50 $m^2/g$-600 $m^2/g$, 50 $m^2/g$-400 $m^2/g$, or 100 $m^2/g$-400 $m^2/g$. Although a second conductive material with a greater BET specific surface area is favorable for the deposition of metal sodium, an excessive BET specific surface area and a correspondingly insufficient particle size of the second conductive material may easily lead to agglomeration and affect the battery performance.

The reverse test method for the BET specific surface area of the second conductive material can be implemented by referring to the following procedures:

a powder scrapped off from the conductive layer is washed with N-methylpyrrolidone (NMP) to remove the binder, and the mixture is filtered, dried, and tested on a BET specific surface area analyzer in accordance with GB/T 19587-2004. Before the test, the powder is dried in a vacuum oven at 200° C. for no less than 2 h, and over 20 g of powder is required in this test.

In some embodiments, the carbon nanotube satisfies any one or more of the following conditions:

(1) the carbon nanotube has an average length of 0.5 μm-30 μm, optionally 2 μm-20 μm, for example, 0.5 μm, 1 μm, 2 μm, 5 m, 8 μm, 10 μm, 15 μm, 20 μm, 25 μm, or 30 μm;

(2) the carbon nanotube has an average diameter of 1 nm-100 nm, optionally 5 nm-10 nm, for example, 1 nm, 3 nm, 5 nm, 10 nm, 20 nm, 30 nm, 40 nm, 50 nm, 60 nm, 70 nm, 80 nm, 90 nm, or 100 nm;

(3) the carbon nanotube has a BET specific surface area of 200 $m^2/g$-3000 $m^2/g$, optionally 250 $m^2/g$-2000 $m^2/g$, for example, 200 $m^2/g$, 250 $m^2/g$, 500 $m^2/g$, 800 $m^2/g$, 1000 $m^2/g$, 1500 $m^2/g$, 2000 $m^2/g$, 2500 $m^2/g$, or 3000 $m^2/g$.

The use of any one or more of the above conditions may improve the conductive network of the carbon nanotube, the conductivity, the specific surface area of the conductive particle, and the deposition of metal sodium or metal lithium.

The average length and average diameter of the carbon nanotube can be tested by referring to the following procedures:

the length and diameter of the carbon nanotube are measured in SEM images at 5-10 positions of the conductive layer, at least 5 length values are averaged to give the average length of the carbon nanotube, and at least 5 diameter values are averaged to give the average diameter of the carbon nanotube.

The test method for the BET specific surface area of the carbon nanotube is as follows:

the conductive layer is scrapped off, dissolved in NMP, and separated by centrifugation, in which the hard carbon is precipitated and the carbon nanotube is suspended in the supernatant. The separated carbon nanotube is tested on a BET specific surface area analyzer in accordance with GB/T 19587-2004. Before the test, the powder is dried in a vacuum oven at 200° C. for no less than 2 h, and over 20 g of powder is required in this test.

In some embodiments, the conductive particle is present in the conductive layer at a mass content of 75%-98%, and the binder is present in the conductive layer at a mass content of 2%-25%. On the basis of maximized increases in conductivity, the stability of the adhesion of the conductive layer to the metal substrate is improved.

The binder used for the conductive layer may be a binder commonly used in the negative electrode plate of secondary batteries. In some embodiments, the binder includes one or more selected from the group consisting of polyvinylidene fluoride, polytetrafluoroethylene, sodium carboxymethylcellulose, methyl acrylate, ethyl acrylate, and a methyl methacrylate-acrylonitrile copolymer. The adhesion and stability of the above binders are slightly different, and those skilled in the art may select specific binders as needed. In some embodiments of the present application, sodium carboxymethylcellulose is used as the binder, which promotes the deposition of metal sodium, improves the initial efficiency of the battery, and enhances the cycle reversibility of the sodium metal.

The metal substrate used for the negative electrode current collector may be a metal material commonly used for the negative electrode plate. In some embodiments of the present application, the metal substrate includes any one of a copper foil, a porous copper, a copper nanowire, an aluminum foil, and an aluminum alloy foil; optionally, the copper foil includes a double-sided rough copper foil, a double-sided smooth copper foil, and a carbon-coated copper foil; optionally, the porous copper includes a porous copper foam and a copper mesh. When the negative electrode current collector is used in a sodium-ion secondary battery, sodium ion does not form an alloy with aluminum, and therefore, aluminum foils or aluminum alloy foils are preferably used as the metal substrate in consideration of cost-efficiency and weight reduction.

In some embodiments, the metal substrate has a thickness of 5 μm-60 μm. Such a thickness of the metal substrate is suitable for various forms such as conventional hard-shell batteries and laminated batteries. In some embodiments, the thickness is optionally 5 μm-10 μm, which may further increase the capacity of the negative electrode plate; in some embodiments, the thickness includes, but is not limited to, 5 μm, 5.5 μm, 6 μm, 6.5 μm, 7 μm, 7.5 μm, 8 μm, 8.5 μm, 9 μm, 9.5 μm, or 10 μm.

[Secondary Battery]

Secondary batteries, also known as rechargeable batteries or storage batteries, refer to batteries that can continue to be used by reactivating their active materials through charging after discharging.

In general, a secondary battery includes a positive electrode plate and a negative electrode plate. During the charging and discharging process of the battery, the active ion (such as lithium ion or sodium ion) is intercalated and deintercalated back and forth between the positive electrode plate and the negative electrode plate.

Another embodiment of the present application provides a secondary battery. The secondary battery includes a positive electrode plate and a negative electrode plate, where the negative electrode plate includes a negative electrode current collector, and the negative electrode current collector includes any one of the negative electrode current collectors according to the present application.

The increased hardness of the negative electrode current collector provided by the present application improves the processing performance of the negative electrode current collector; due to the control of the thickness of the conductive layer, the capacity of the battery is enhanced. Therefore, the secondary battery of the present application features high processability and high-capacity characteristics.

The negative electrode plate is formed by in-situ deposition of a sodium layer on the negative electrode current collector after the secondary battery has been subjected to the first charge and discharge cycle. The sodium dendrite of the negative electrode plate is effectively controlled, and no severe sodium dendrite occurs.

[Positive Electrode Plate]

A positive electrode plate generally includes a positive electrode current collector and a positive electrode film layer disposed on at least one surface of the positive electrode current collector, and the positive electrode film layer includes a positive electrode active substance.

As an example, the positive electrode current collector has two surfaces opposite to each other in its own thickness direction, and the positive electrode film layer is disposed on any one or both of the two opposite surfaces of the positive electrode current collector.

In some embodiments, a metal foil or a composite current collector may be used as the positive electrode current collector. For example, as the metal foil, an aluminum foil may be used. The composite current collector may include a polymer material substrate and a metal layer formed on at least one surface of the polymer material substrate. The composite current collector may be formed by forming a metal material (aluminum, aluminum alloy, nickel, nickel alloy, titanium, titanium alloy, silver, silver alloy, etc.) on a polymer material substrate (such as polypropylene (PP), polyethylene terephthalate (PET), polybutylene terephthalate (PBT), polystyrene (PS), and polyethylene (PE)).

In some embodiments of the present application, the positive electrode active substance of the positive electrode plate includes any one or more oxides having the chemical formula of $Na_xM_yP_mO_n$, where M denotes a transition metal element including any one or more selected from the group consisting of Mn, Fe, Co, Cu, Al, Ti, and V, $1 \leq x \leq 2$, $0 \leq y \leq 1$, $1 \leq m \leq 2$, $4 \leq n \leq 8$, and $0 \leq x/m \leq 1$.

In some embodiments, x may be 1, 1.1, 1.2, 1.3, 1.4, 1.5, 1.6, 1.7, 1.8, 1.9, or 2; y is 0, 0.001, 0.005, 0.01, 0.05, 0.1, 0.2, 0.3, 0.4, 0.5, 0.6, 0.7, 0.8, 0.9, or 1.0; m is 0, 0.1, 0.3, 0.5, 0.8, 1.0, 1.2, 1.5, 1.7, or 2, and n is 4, 4.5, 5, 5.5, 6, 6.5, 7, 7.5, or 8.

In some embodiments, the positive electrode film layer further optionally includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylic resin.

In some embodiments, the positive electrode film layer further optionally includes a conductive agent. As an example, the conductive agent may include at least one of superconducting carbon, acetylene black, carbon black, Ketjen black, a carbon dot, a carbon nanotube, a graphene, and a carbon nanofiber.

In some embodiments, the positive electrode plate may be prepared in the following manner: dispersing the components described above for preparing the positive electrode plate, such as the positive electrode active material, the conductive agent, the binder, and any other components, in a solvent (such as N-methylpyrrolidone) to form a positive electrode slurry; and coating the positive electrode current collector with the positive electrode slurry, and performing drying, cold pressing, and other processes, so as to give the positive electrode plate.

[Electrolyte]

An electrolyte is arranged between the positive electrode plate and the negative electrode plate and conducts ions between the positive electrode plate and the negative electrode plate. The present application has no specific restrictions on the type of the electrolyte, which may be selected as needed. For example, the electrolyte may be liquid, gel, or all solid.

In some embodiments of the present application, the electrolyte includes a solvent and an electrolyte salt, the solvent includes one or more selected from the group consisting of dimethyl sulfide, dimethoxyethane (DME), dioxolane (DOL), acetonitrile (AN), diethylene glycol dimethyl ether (DIGLYME), methyl trifluoroethyl carbonate (FEMC), fluorobenzene, tetraethylene glycol dimethyl ether (TETRAGLYME), triethyl phosphate, sulfolane, 2-methyl tetrahydrofuran, tetrahydrofuran, 2,2,2,2-trifluoroethyl ether, ethylene glycol diethyl ether, dimethyl sulfoxide, N,N-dimethylacetamide, and triethylene glycol dimethyl ether; optionally, the solvent includes tetrahydrofuran and/or dimethoxyethane. When the solvent is tetrahydrofuran and/or dimethoxyethane, the solvation energy of the solvent is low, such that sodium ion can be rapidly deintercalated.

In some embodiments of the present application, the electrolyte salt includes at least two selected from the group consisting of sodium hexafluorophosphate, sodium perchlorate, sodium bis(fluorosulfonyl)imide, sodium trifluoromethanesulfonate, sodium sulfide, and sodium nitrate; optionally, the electrolyte salt includes a double salt of $NaPF_6$ and $NaNO_3$. Nitrate is more desirable for the deposition of sodium ion on the negative electrode.

In some embodiments, the electrolytic solution further optionally includes an additive. As an example, the additive may include a negative electrode film-forming additive, a positive electrode film-forming additive, and may also include an additive capable of improving certain performance of the battery, such as an additive for improving the overcharge performance of the battery, an additive for improving the high- or low-temperature performance of the battery, or the like.

[Separation Film]

In some embodiments, the secondary battery further includes a separation film. The separation film is disposed between the positive electrode plate and the negative electrode plate to primarily prevent the positive and negative electrodes from short-circuiting, while allowing the passage of active ions. The present application does not particularly limit the type of the separation film, and any porous-structure separation film known to have good chemical stability and mechanical stability may be selected and used.

In some embodiments, the separation film may be made of a material selected from at least one of a glass fiber, a non-woven fabric, polyethylene, polypropylene, and polyvinylidene difluoride. The separation film may be a single-layer film or a multi-layer composite film, which is not particularly limited. When the separation film is a multi-layer composite film, the materials of the layers may be identical or different, which is not particularly limited.

In some embodiments, the positive electrode plate, the negative electrode plate, and the separation film may be manufactured into an electrode assembly through a winding process or a stacking process.

In some embodiments, the secondary battery may include an outer packaging. The outer packaging can be used for packaging the electrode assembly and electrolyte described above.

In some embodiments, the outer packaging of the secondary battery may be a hard shell, such as a hard plastic shell, an aluminum shell, or a steel shell. The outer packaging of the secondary battery may also be a soft pack, such as a pouch-type soft pack. The soft pack may be made of a plastic material, and examples of the plastic material may include polypropylene, polybutylene terephthalate, polybutylene succinate, and the like.

The present application does not particularly limit the shape of the secondary battery, and it may have a cylindrical shape, a prismatic shape, or any other shape. For example, FIG. 1 shows a secondary battery 5 having a prismatic structure as one example.

Figure 2:
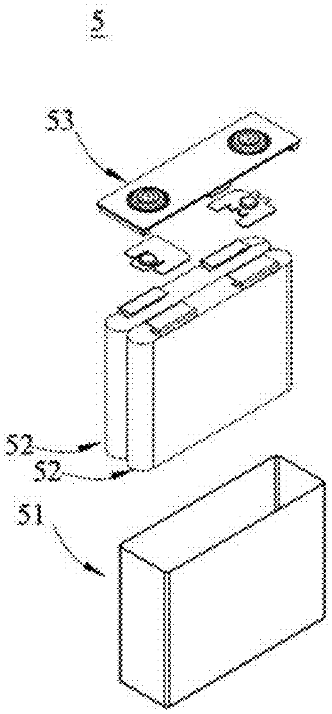
FIG. 2 is an exploded view of the secondary battery according to one embodiment of the present application shown in FIG. 1.

In some embodiments, referring to FIG. 2, the outer packaging may include a housing 51 and a cover plate 53. The housing 51 may include a bottom plate and a side plate connected to the bottom plate, and the bottom plate and the side plate define, in an enclosing manner, an accommodating cavity. The housing 51 is provided with an opening communicating with the accommodating cavity, and the opening is lidded with the cover plate 53 to close the accommodating cavity. The positive electrode plate, the negative electrode plate, and the separation film may be subjected to a winding process or a stacking process to form an electrode assembly 52. The electrode assembly 52 is packaged in the accommodating cavity. The electrolytic solution is infiltrated into the electrode assembly 52. The number of electrode assemblies 52 included in the secondary battery 5 may be one or more, and those skilled in the art can select the number according to specific and actual needs.

In some embodiments, the secondary battery may be assembled into a battery module. The number of secondary batteries included in the battery module may be one or more, and the specific number may be selected by those skilled in the art based on the use and capacity of the battery module.

Figure 3:
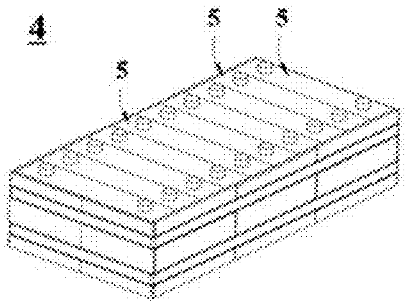
FIG. 3 is a schematic view of a battery module according to one embodiment of the present application.

FIG. 3 shows a battery module 4 as one example. Referring to FIG. 3, in the battery module 4, a plurality of secondary batteries 5 may be sequentially arranged in the length direction of the battery module 4. Certainly, the arrangement may also be in any other manner. Further, the plurality of secondary batteries 5 may be fixed by a fastener.

Optionally, the battery module 4 may further include a shell having an accommodating space, in which the plurality of secondary batteries 5 are accommodated.

In some embodiments, the battery module described above may also be assembled into a battery pack. The number of battery modules included in the battery pack may be one or more, and the specific number may be selected by those skilled in the art based on the use and capacity of the battery pack.

Figure 4:
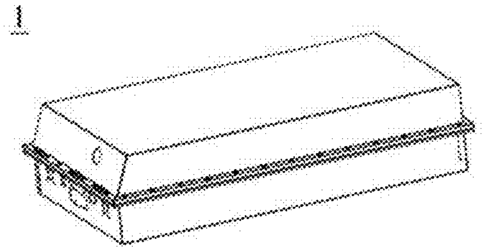
FIG. 4 is a schematic view of a battery pack according to one embodiment of the present application.
Figure 5:
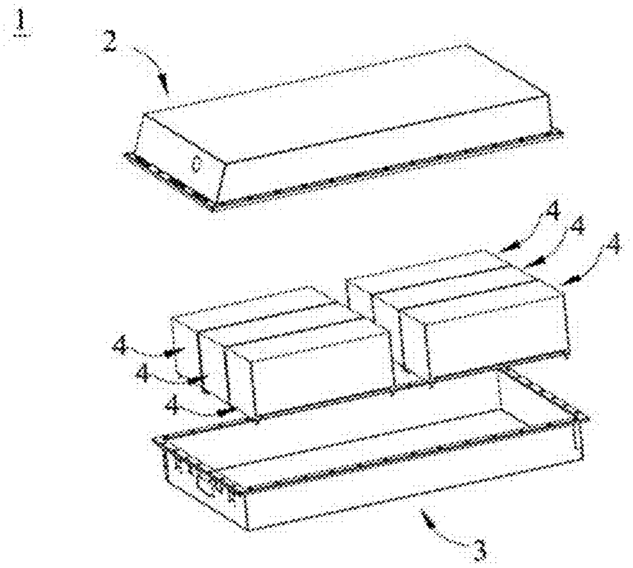
FIG. 5 is an exploded view of the battery pack according to one embodiment of the present application shown in FIG. 4.

FIG. 4 and FIG. 5 show a battery pack 1 as one example. Referring to FIG. 4 and FIG. 5, the battery pack 1 may include a battery case and a plurality of battery modules 4 arranged in the battery case. The battery case includes an upper case body 2 and a lower case body 3. The upper case body 2 is capable of lidding the lower case body 3 to form a closed space for accommodating the battery modules 4. The plurality of battery modules 4 may be arranged in any manner in the battery case.

In addition, the present application further provides an electrical device. The electrical device includes at least one of the secondary battery, the battery module, or the battery pack provided in the present application. The secondary battery, the battery module, or the battery pack may be used as a power source for the electrical device, and they may also be used as an energy storage unit for the electrical device. The electrical device may include, but is not limited to, a mobile device (e.g., a mobile phone or a laptop computer), an electric vehicle (e.g., a pure electric vehicle, a hybrid electric vehicle, a plug-in hybrid electric vehicle, an electric bicycle, an electric scooter, an electric golf cart, or an electric truck), an electric train, ship, or satellite, an energy storage system, or the like.

The secondary battery, the battery module, or the battery pack may be selected as the electrical device on the basis of the requirements of use.

Figure 6:
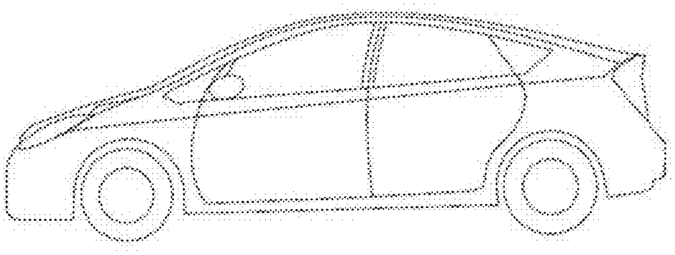
FIG. 6 is a schematic view of an electrical device using a secondary battery as the power source according to one embodiment of the present application.

FIG. 6 shows an electrical device as one example. The electrical device is a pure electric vehicle, a hybrid electric vehicle, a plug-in hybrid electric vehicle, or the like. To meet the requirements of the electrical device for secondary batteries with high power and high energy density, battery packs or battery modules may be used.

Examples

Hereinafter, examples of the present application are described. The examples described below are exemplary and merely illustrative of the present application, and should not be construed as limiting the present application. Examples without techniques or conditions specified therein are implemented according to techniques or conditions described in the literature in the art or according to product instructions. Reagents or instruments used herein without specified manufacturers are all commercially available conventional products.

Negative Electrode Current Collector

An aluminum foil with a thickness of 10 μm was used as the metal substrate of the negative electrode current collector. A conductive particle and sodium carboxymethylcellulose were dispersed in dimethoxyethane to form a conductive slurry, where the conductive particle are composed of a first conductive material and a second conductive material, and the mass ratio of the conductive particle to the sodium carboxymethylcellulose was 4:1. The conductive slurry was applied to both sides of the metal substrate (referring to Table 1 for the coating weight). After drying, a conductive layer with a certain thickness was formed, so as to give the negative electrode current collectors in the examples and comparative examples.

The $D_V50$ value of the first conductive material was measured using a laser particle size analyzer. The results are recorded in Table 1.

The Vickers hardness of the first conductive material and the Vickers hardness of the negative electrode current collector were tested in accordance with GBT_7997-2014 Hardmetals—Vickers Hardness Test. The results are recorded in Table 1.

The BET specific surface area of the second conductive material was measured on a BET specific surface area analyzer in accordance with GB/T 19587-2004. Before the test, the powder was dried in a vacuum oven at 200° C. for no less than 2 h, and over 20 g of powder was required in this test. The results are recorded in Table 1.

The thickness of the conductive layer was measured according to the SEM images of the lateral sections of the negative electrode current collectors. The results are recorded in Table 1.

The compositions of the negative electrode current collectors for the examples and comparative examples are described in Table 1.

TABLE 1

| | Metal substrate Vickers hardness | Conductive layer | | | | | | Vickers hardness of negative electrode current collector (Mpa) |
|---|---|---|---|---|---|---|---|---|
| | | First conductive material | | | Second conductive material | | | |
| | | Component and mass content | DV50 (μm) | Vickers hardness (Mpa) | Component and mass content | BET specific surface area ($m^2/g$) | Thickness (μm) | |
| Example 1 | 343 | Hard carbon/80% | 2 | 792 | Super P carbon black/20% | 365 | 3 | 735 |
| Example 2 | 343 | Hard carbon/70% | 2 | 792 | Super P carbon black/30% | 401 | 3 | 671 |
| Example 3 | 343 | Hard carbon/85% | 2 | 792 | Super P carbon black/15% | 204 | 3 | 757 |
| Example 4 | 343 | Hard carbon/80% | 2 | 792 | Super P carbon black/20% | 365 | 0.5 | 710 |
| Example 5 | 343 | Hard carbon/80% | 2 | 792 | Super P carbon black/20% | 365 | 6 | 766 |
| Example 6 | 343 | Hard carbon/80% | 2 | 792 | Super P carbon black/20% | 365 | 5 | 742 |
| Example 7 | 343 | Hard carbon/50% | 1 | 792 | Super P carbon black/49.5% | 365 | 3 | 677 |
| Example 8 | 343 | Hard carbon/80% | 2 | 455 | Super P carbon black/20% | 365 | 3 | 553 |
| Example 9 | 343 | Hard carbon/80% | 2 | 500 | Super P carbon black/20% | 365 | 3 | 606 |
| Example 10 | 343 | Hard carbon/80% | 2 | 603 | Super P carbon black/20% | 365 | 3 | 642 |
| Example 11 | 343 | Hard carbon/95% | 2 | 792 | Carbon nanotube, length 10 μm + inner diameter 30 nm/5% | 1600 | 3 | 850 |
| Example 12 | 343 | Hard carbon/70% | 0.5 | 792 | Super P carbon black/30% | 600 | 3 | 704 |
| Example 13 | 343 | Hard carbon/70% | 6 | 792 | Super P carbon black/30% | 303 | 3 | 633 |
| Example 14 | 343 | Hard carbon/70% | 8 | 792 | Super P carbon black/30% | 496 | 3 | 705 |
| Example 15 | 343 | Hard carbon/50% | 2 | 792 | Super P carbon black/50% | 700 | 3 | 555 |
| Example 16 | 343 | Hard carbon/90% | 2 | 792 | Super P carbon black/10% | 108 | 3 | 761 |
| Example 17 | 343 | Hard carbon/99% | 0.5 | 792 | Super P carbon black/1% | 20 | 3 | 847 |
| Example 18 | 343 | Hard carbon/1% | 6 | 792 | Super P carbon black/99% | 911 | 3 | 460 |
| Comparative Example 1 | 343 | Hard carbon/100% | 2 | 792 | — | — | 3 | 870 |
| Comparative Example 2 | 343 | — | — | — | Super P carbon black/100% | 365 | 3 | 395 |
| Comparative Example 3 | 343 | Hard carbon/80% | 2 | 792 | Super P carbon black/20% | 365 | 0.1 | 352 |
| Comparative Example 4 | 343 | Hard carbon/80% | 2 | 792 | Super P carbon black/20% | 365 | 10 | 1098 |

Assembly of Secondary Battery:

1. Positive Electrode Plate

The positive electrode active substance $NaFePO_4$, the conductive agent acetylene black, and the binder carboxymethyl cellulose were mixed in N-methylpyrrolidone (NMP) by uniform stirring in a mass ratio of 90:5:5, so as to form a uniform positive electrode slurry. The positive electrode slurry was evenly applied to the surface of the aluminum foil of the positive electrode current collector, followed by drying, cold pressing, and die cutting, to give the positive electrode plate.

2. Negative Electrode Plate

The negative electrode current collectors described above were used as the negative electrode plates of the secondary batteries in the examples and comparative examples.

3. Separation Film

A 12 μm polyethylene film was used as the porous base film, and a compression roller was used to press the polyethylene film to form a recess. The recess formed a recessed region, and the recessed region extended in the length direction of the separation film. The shape of the recessed region may be adjusted according to the shape of the compression roller.

4. Electrolytic Solution

In an argon-filled glove box with a water content of <1 ppm, diethylene glycol dimethyl ether and tetrahydrofuran were mixed in a mass ratio of 1:3, and sodium hexafluorophosphate ($NaPF_6$) at a concentration of 1.0 mol/L was added. After stirring uniformly, the electrolytic solution was obtained.

5. Preparation of Sodium-Ion Battery Cell

The positive electrode plate, separation film, and negative electrode plate were used to form an electrode assembly through a stacking process, and then the electrode assembly was placed in an outer packaging and dried, before the electrolytic solution was injected. A sodium-ion battery cell was obtained after vacuum packaging, standing, formation, shaping, and the like. Later, the sodium-ion battery cell was vertically placed with its height direction parallel to the length direction of the separation film.

Test:

1) Dendrite test: A fully charged sodium-ion secondary battery was disassembled after 100 charge-discharge cycles at 1 C, the surface topography of the negative electrode of metal sodium was observed through an optical microscope, the cross-sectional topography of metal sodium was observed through an electron microscope, and the thickness of the deposited sodium metal was measured and compared with the theoretical deposition thickness (as defined in the corresponding embodiment of the present application). A thickness increase ratio of less than 140% indicated no sodium dendritic growth; a thickness increase ratio of 150%-200% indicated mild dendritic growth; a thickness increase ratio was 200%-230% indicated moderate dendritic growth; a thickness increase ratio of 230%-300% indicated severe dendritic growth.
2) Brittle failure of negative electrode current collector (4 cm×25 cm) 100 $cm^2$
2) The negative electrode current collector with a dimension of (4 cm×25 cm) was taken, folded in half in the longitudinal direction, and compressed with a cylindrical roller to ensure a seamless contact of the two parts of the film;
3) The crease was observed under light. If no light transmission was observed at the crease and the film was not broken, the brittleness performance of the negative electrode current collector was deemed acceptable. Otherwise, it was considered as broken, and the number of folds at the time of breakage was recorded.

TABLE 2

| | Number of folds before brittle failure | Sodium dendrite |
|---|---|---|
| Example 1 | 6 folds | No dendrite |
| Example 2 | 5 folds | No dendrite |
| Example 3 | 6 folds | No dendrite |
| Example 4 | 5 folds | No dendrite |
| Example 5 | 6 folds | No dendrite |
| Example 6 | 6 folds | No dendrite |
| Example 7 | 5 folds | No dendrite |
| Example 8 | 4 folds | No dendrite |
| Example 9 | 5 folds | No dendrite |
| Example 10 | 5 folds | No dendrite |
| Example 11 | 7 folds | No dendrite |
| Example 12 | 5 folds | No dendrite |
| Example 13 | 5 folds | No dendrite |
| Example 14 | 3 folds | Moderate dendritic growth |
| Example 15 | 4 folds | No dendrite |
| Example 16 | 6 folds | No dendrite |
| Example 17 | 3 folds | No dendrite |
| Example 18 | 5 folds | No dendrite |
| Comparative Example 1 | 2 folds | Moderate dendritic growth |
| Comparative Example 2 | 2 folds | Dendritic growth observed |
| Comparative Example 3 | 4 folds | Severe dendritic growth |
| Comparative Example 4 | 1 fold | No dendrite |

As can be seen from the data in Table 1 above, in Examples 1 to 3, the Vickers hardness of the negative electrode current collector can be effectively increased as the mass content of the hard carbon increases, thereby improving the processability of the battery.

As can be seen from the comparison among Examples 2, 7, and 15, when the $D_v50$ particle size of the hard carbon is reduced, the dispersion of the hard carbon in the conductive layer is facilitated, and thus the effect of improving the Vickers hardness of the negative electrode current collector is more significant.

As can be seen from the comparison among Examples 4 to 6, Comparative Example 3, and Comparative Example 4, the Vickers hardness of the negative electrode current collector increases as the thickness of the conductive layer increases. When the thickness of the conductive layer is within the range of 0.5 μm-6 μm, the Vickers hardness exhibits mild variation, but once the thickness is increased to 10 μm, the Vickers hardness shows remarkable increases, thus affecting the brittle failure performance of the negative electrode current collector. In addition, although the negative electrode current collector of Comparative Example 3 exhibits good brittle failure performance, the insufficient thickness of the conductive layer led to sodium intercalation and thus severe dendritic growth, thereby affecting the capacity and cycle performance of the battery.

As can be seen from the comparison of Examples 12 to 14, an excessive $D_v50$ particle size of the hard carbon may lead to an increased Vickers hardness of the negative electrode current collector, but may cause sodium dendritic growth.

In Example 11 where a carbon nanotube was contained, although the Vickers hardness of the negative electrode current collector was increased, the brittle failure performance of the negative electrode current collector was improved due to the presence of the carbon nanotube, leading to improved processability.

Compared to the negative electrode current collectors in the examples, the insufficient hardness of the negative electrode current collector in Comparative Example 2 resulted in insufficient improvement of the processability of the battery. In addition, the absence of hard carbon in the conductive layer may easily cause sodium intercalation, thus affecting the capacity and cycle performance of the battery.

Although the present application has been described with reference to preferred examples, various modifications can be made and components can be replaced with equivalents without departing from the scope of the present application. In particular, the technical features mentioned in the embodiments may be combined in any manner as long as there are no structural conflicts. The present application is not limited to the specific embodiments disclosed herein, but encompasses all technical solutions falling within the scope of the claims.

What is claimed is:

1. A negative electrode current collector comprising a metal substrate and a conductive layer provided on at least one surface of the metal substrate, wherein the negative electrode current collector has a Vickers hardness of 400 Mpa-850 Mpa, and the conductive layer has a thickness of 0.5 μm-6 μm, wherein the conductive layer comprises a conductive particle and a binder, the conductive particle comprises a first conductive material and a second conductive material, the first conductive material comprises any one or more selected from the group consisting of a hard carbon and a soft carbon, and the second conductive material comprises any one or more selected from the group consisting of a conductive carbon black, a carbon dot, a graphene, a carbon nanotube, a carbon fiber, and a metal micro-nano particle, and wherein the conductive particle comprises the hard carbon and the conductive carbon black, the hard carbon is present in the conductive particle at a mass content of 50%-90%, and the conductive carbon black is present in the conductive particle at a mass content of 10%-50%; or the conductive particle comprises the hard carbon, the conductive carbon black, and the carbon nanotube, the hard carbon is present in the conductive particle at a mass content of 50%-90%, the conductive carbon black is present in the conductive particle at a mass content of 10%-50%, and the carbon nanotube is present in the conductive particle at a mass content of 0.001%-1%, and wherein the first conductive material has a $D_v50$ particle size of 0.5 μm-6 μm and the conductive particle is present in the conductive layer at a mass content of 75%-80% based on a total mass of the conductive particle and the binder.

2. The negative electrode current collector according to claim 1, wherein the hard carbon has a Vickers hardness of 450 Mpa-800 Mpa.

3. The negative electrode current collector according to claim 1, wherein the second conductive material has a BET specific surface area of 5 $m^2/g$-3000 $m^2/g$.

4. The negative electrode current collector according to claim 1, wherein the carbon nanotube satisfies any one or more of the following conditions:

(1) the carbon nanotube has an average length of 0.5 μm-30 μm;

(2) the carbon nanotube has an average diameter of 1 nm-100 nm;

(3) the carbon nanotube has a BET specific surface area of 200 $m^2/g$-3000 $m^2/g$.

5. The negative electrode current collector according to claim 1, wherein the conductive particle is present in the conductive layer at a mass content of 75%-98%, and the binder is present in the conductive layer at a mass content of 2%-25%.

6. The negative electrode current collector according to claim 1, wherein the binder comprises one or more selected from the group consisting of polyvinylidene fluoride, polytetrafluoroethylene, sodium carboxymethylcellulose, methyl acrylate, ethyl acrylate, and a methyl methacrylate-acrylonitrile copolymer.

7. The negative electrode current collector according to claim 1, wherein the metal substrate comprises any one of a copper foil, a porous copper, a copper nanowire, an aluminum foil, and an aluminum alloy foil; the copper foil comprises a double-sided rough copper foil, a double-sided smooth copper foil, and a carbon-coated copper foil; and the porous copper comprises a porous copper foam and a copper mesh;

and/or the metal substrate has a thickness of 5 μm-60 μm.

8. A secondary battery comprising a positive electrode plate and a negative electrode plate, wherein the negative electrode plate comprises a negative electrode current collector, and the negative electrode current collector comprises the negative electrode current collector according to claim 1.

9. The secondary battery according to claim 8, wherein the negative electrode plate is formed by in-situ deposition of a sodium layer on the negative electrode current collector after the secondary battery has been subjected to the first charge and discharge cycle.

10. The secondary battery according to claim 8, wherein a positive electrode active substance of the positive electrode plate comprises any one or more oxides having the chemical formula of $Na_xM_yP_mO_n$, wherein M denotes a transition metal element comprising any one or more selected from the group consisting of Mn, Fe, Co, Cu, Al, Ti, and V, $1 \le x \le 2$, $0 \le y \le 1$, $1 \le m \le 2$, $4 \le n \le 8$, and $0 \le x/m \le 1$.

11. The secondary battery according to claim 8, wherein the secondary battery further comprises an electrolyte, the electrolyte comprises a solvent and an electrolyte salt, the solvent comprises one or more selected from the group consisting of dimethyl sulfide, dimethoxyethane, dioxolane, acetonitrile, diethylene glycol dimethyl ether, methyl trifluoroethyl carbonate, fluorobenzene, tetraethylene glycol dimethyl ether, triethyl phosphate, sulfolane, 2-methyl tetrahydrofuran, tetrahydrofuran, 2,2,2,2-trifluoroethyl ether, ethylene glycol diethyl ether, dimethyl sulfoxide, N,N-dimethylacetamide, and triethylene glycol dimethyl ether; optionally, the solvent comprises tetrahydrofuran and/or dimethoxyethane; and/or the electrolyte salt comprises at least two selected from the group consisting of sodium hexafluorophosphate, sodium perchlorate, sodium bis(fluorosulfonyl)imide, sodium trifluoromethanesulfonate, sodium sulfide, and sodium nitrate.

12. An electrical device comprising a secondary battery, wherein the secondary battery is selected from the secondary battery according to claim 8.

* * * * *